United States Patent [19]

Segawa et al.

[11] Patent Number: 5,153,314
[45] Date of Patent: Oct. 6, 1992

[54] PROCESS FOR PRODUCING A COPPER PHTHALOCYANINE COMPOUND

[75] Inventors: Tomio Segawa; Kazuhiro Maruyama; Tadashi Ninomiya; Motokazu Suyama, all of Kawasaki, Japan

[73] Assignee: Kawasaki Kasei Chemicals Ltd., Tokyo, Japan

[21] Appl. No.: 606,857

[22] Filed: Oct. 31, 1990

[30] Foreign Application Priority Data

Nov. 21, 1989 [JP] Japan .................................. 1-300920

[51] Int. Cl.$^5$ ...................... C09B 47/06; C09B 47/04; C07D 487/22
[52] U.S. Cl. ...................................................... 540/144
[58] Field of Search ......................................... 540/144

[56] References Cited

U.S. PATENT DOCUMENTS 4,906,747 3/1990 Segawa et al. ....................... 540/144

FOREIGN PATENT DOCUMENTS 266219 5/1988 European Pat. Off. .

OTHER PUBLICATIONS

Chemical Abstracts, vol. 87, No. 87: 169255u; 1977, p. 63, Baurecht.
Chemical Abstracts, vol. 89, No. 89: 76333u; 1978, p. 58, Schmitz.
Sumitomo, Chem. Abs. 97, 218034 (1982).

Primary Examiner—Mark L. Berch
Attorney, Agent, or Firm—Oblon, Spivak, McClelland, Maier & Neustadt

[57] ABSTRACT

A process for producing a copper phthalocyanine compound, which comprises heating and reacting phthalic acid or a phthalic acid derivative, urea or a urea derivative and cuprous chloride in the presence of a catalyst in an inert organic solvent, wherein the cuprous chloride is used in an amount of from 95 to 99% of the stoichiometric amount relative to the phthalic acid or the phthalic acid derivative.

12 Claims, 3 Drawing Sheets

FIGURE 1
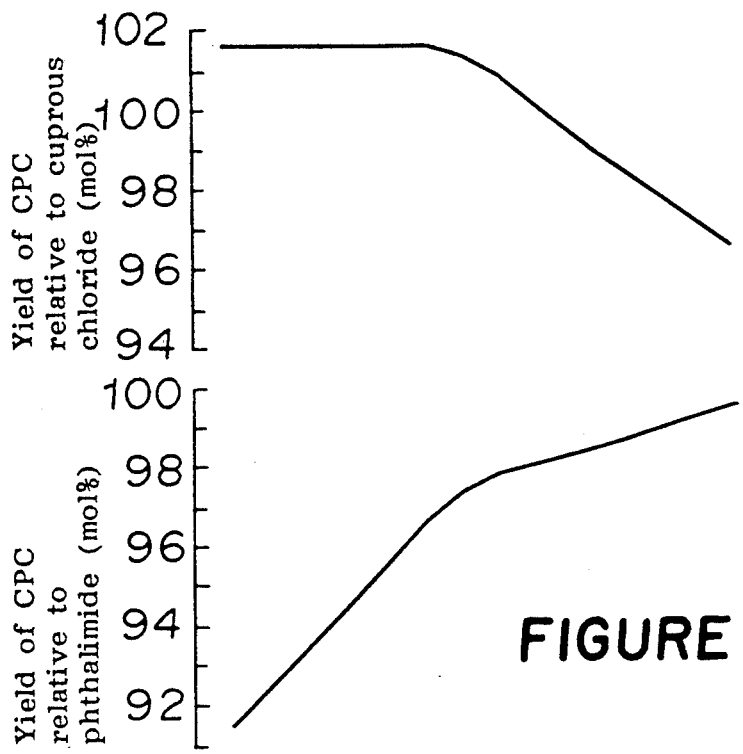
FIGURE 2
FIGURE 3
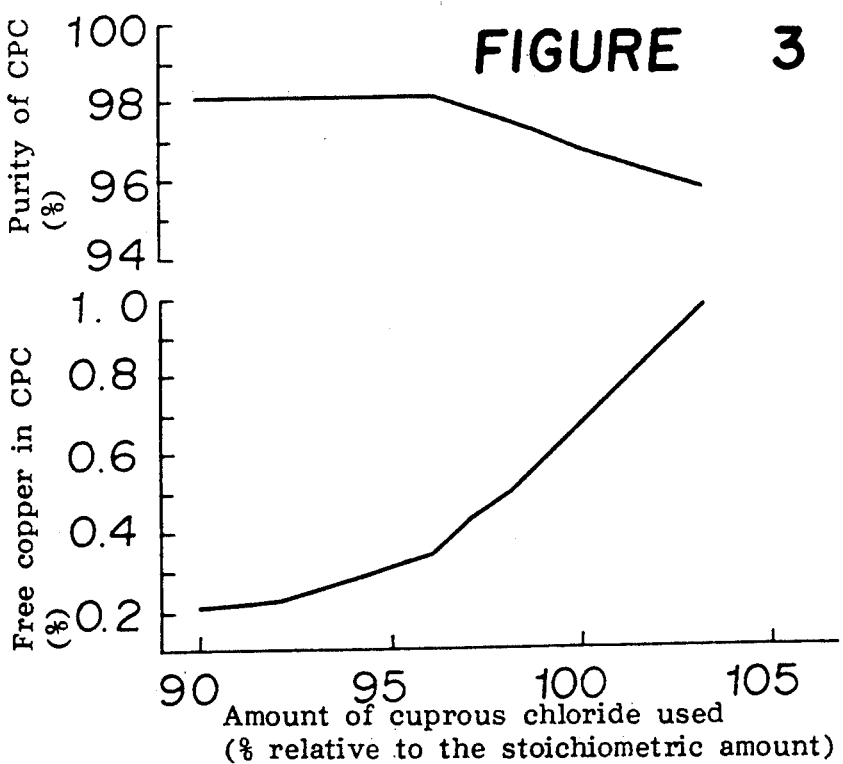
FIGURE 4

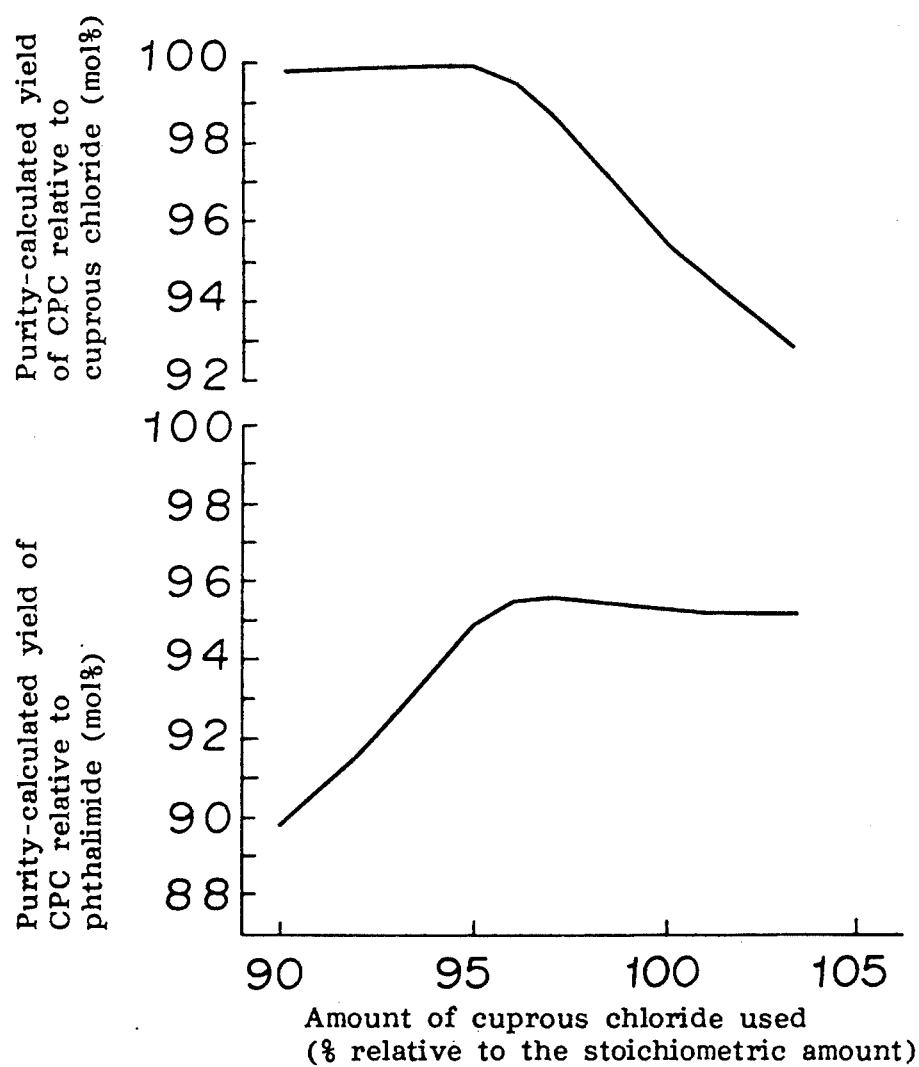

PROCESS FOR PRODUCING A COPPER PHTHALOCYANINE COMPOUND

The present invention relates to a process for producing a copper phthalocyanine compound having a high purity and a low content of an unreacted copper compound at a low cost.

For the production of a copper phthalocyanine compound, it has been most common to employ as an industrial method a method which comprises heating phthalic acid or a phthalic acid derivative (hereinafter referred to simply as phthalic acid and its derivative), urea or a urea derivative (hereinafter referred to simply as urea and its derivative) and a copper compound in the presence of a catalyst in an inert organic solvent.

This process may be represented by the following chemical reaction formulas wherein the phthalic acid or its derivative is represented by phthalimide, and the urea or its derivative is represented by urea, and the copper compound is represented by cuprous chloride:

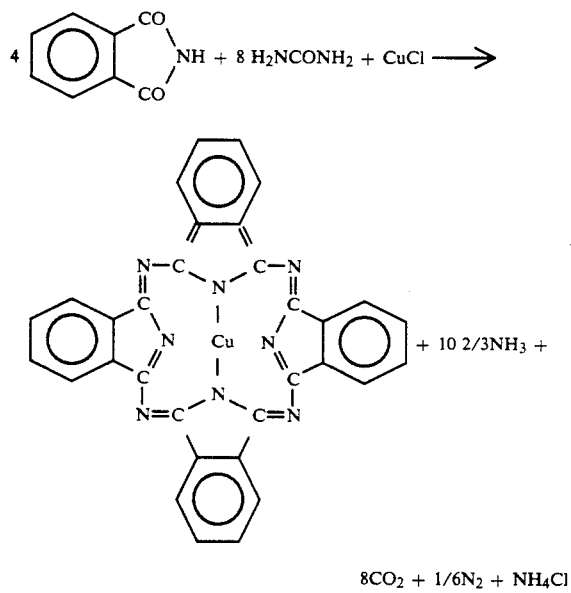

$8CO_2 + 1/6N_2 + NH_4Cl$

In this process, the yield of the copper phthalocyanine compound is said to show the maximum value for the first time when the copper compound is used in its stoichiometrical amount (i.e. ¼ mol time relative to the phthalic acid or its derivative) or more. Accordingly, it has been a common knowledge among those skilled in the art to employ the stoichiometric amount or more of the copper compound also for the industrial purposes.

A process has been proposed in which the copper compound is used in an amount less than the stoichiometrical amount during the intermediate stage of the reaction and at the final stage of the reaction, the copper compound is used in the stoichiometric amount or slightly in excess, for the purpose of improving the yield of copper phthalocyanine (provided that the yield is represented by the value calculated by the method of calculation as will be described in the Examples) and obtaining a clear color. However, after all, the amount of the copper compound used is at least the stoichiometric amount relative to phthalic acid or its derivative. Among literatures, there is a rare case which discloses use of a copper compound in an amount of from 20 to 30 mol % relative to phthalic acid or its derivative. Even in such a case, the preferred range is disclosed to be from 25 to 27 mol %, and in the Examples, the copper compound is used in an amount of at least the stoichiometric amount (Japanese Examined Patent Publication No. 32886/1977).

From the reaction product thus obtained, the solvent is distilled off under reduced pressure after completion of the reaction. The residue is washed with hot water to obtain a crude copper phthalocyanine compound, which has a purity of from 90 to 96% and contains an unreacted copper compound (hereinafter referred to as free copper, and its content will be shown by % as calculated as metal copper) in an amount of from 0.8 to 1.2%. Thus, the crude compound is of low quality. Further, a certain amount of copper ions are contained in the filtrate of washing solution, and their removal is required.

Copper phthalocyanine may sometimes be used with such a quality (product washed with hot water). In such a case, the purity being low and free copper being substantial are likely to cause problems. Especially such free copper causes elution of copper ions in waste water when the copper phthalocyanine is converted to a pigment or chlorinated to produce a polychlorocopper phthalocyanine, and the copper ions will then cause an environmental pollution. Therefore, the free copper is strictly regulated by law and must be removed.

For the purpose of improving the purity and removing free copper, the above-mentioned solvent-removed product or the product washed with hot water is sometimes subjected to acid washing with e.g. dilute sulfuric acid. It is thereby usually possible to obtain a product having a purity of at least 97% and a free copper content of from 0.2 to 0.5%. However, as a matter of course, the yield of the product decreases as the purity increases. Further, it is necessary to neutralize the acid used. Furthermore, copper ions corresponding to the reduction of free copper will eventually elute into the washing solution which will be discharged as a filtrate, and an operation for the removal of such copper ions will be required. Therefore, the concerned industry is obliged to spend a substantial investment for this operation.

The present inventors have conducted extensive studies with an aim to obtain a copper phthalocyanine compound having a quality equal to the conventional acid-washed product i.e. a purity of at least 97% and a free copper content of at most 0.5% without requiring the acid washing step i.e. only by washing with hot water and to reduce the content of copper ions in the filtrate resulting by washing with hot water, and as a result, have accomplished the present invention.

The present invention provides a process for producing a copper phthalocyanine compound, which comprises heating and reacting phthalic acid or a phthalic acid derivative, urea or a urea derivative and cuprous chloride in the presence of a catalyst in an inert organic solvent, wherein the cuprous chloride is used in an amount of from 95 to 99% of the stoichiometric amount relative to the phthalic acid or the phthalic acid derivative.

In the above process, it is preferred that after completion of the reaction, the solvent is distilled off from the reaction product, and the residue thereby obtained is washed with hot water. It is further preferred that the purity of the copper phthalocyanine obtained by washing with hot water is at least 97%, and free copper is at most 0.5%.

Now, the present invention will be described in detail with reference to the preferred embodiments.

In the accompanying drawings:

FIG. 1 shows the yield of copper phthalocyanine relative to the amount of cuprous chloride used (abscissa, the unit being % relative to the stoichiometric amount) in a case where tert-amylbenzene was used as the solvent for reaction.

FIG. 2 shows the yield of copper phthalocyanine relative to phthalimide with the same abscissa.

FIG. 3 shows the purity of copper phthalocyanine with the same abscissa.

FIG. 4 shows free copper in the copper phthalocyanine with the same abscissa.

FIG. 5 shows the yield as calculated as the purity of copper phthalocyanine relative to cuprous chloride with the same abscissa.

FIG. 6 shows the yield as calculated as the purity of copper phthalocyanine relative to phthalimide with the same abscissa.

Figures 7, 8:
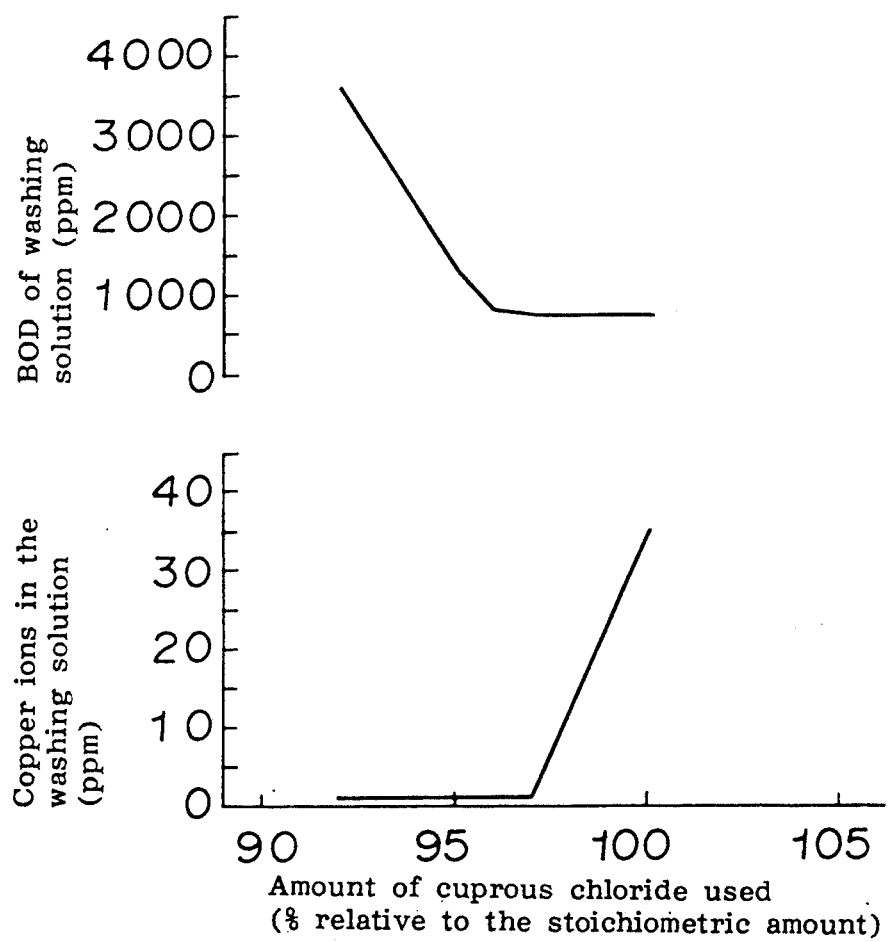
FIG. 7 shows the amount of copper ions in the washing solution with the same abscissa.

In the Figures, CPC represents copper phthalocyanine.

The phthalic acid and its derivative used as the starting material in the present invention may be phthalic acid, phthalic anhydride, phthalimide or a phthalic acid derivative corresponding to such a compound with the 3 or 4 position of the benzene nuclei substituted by chlorine or bromine. These materials may be used in combination as a mixture of two or more. The urea or its derivative as the starting material may be urea, buret, or tolyuret. However, it is usual to employ urea.

Further, as the catalyst, a number of known catalysts are available. However, it is common to employ molybdenum or a molybdenum compound such as ammonium molybdate or molybdenum oxide. Particularly preferred is ammonium molybdate. The catalyst is used in an amount of from 0.003 to 5% by weight, preferably from 0.02 to 0.2% by weight, relative to the phthalic acid or its derivative.

As the solvent, a known inert organic solvent having a relatively high boiling point may be employed. Such a solvent includes, for example, an alkylbenzene compound such as diisopropylbenzene, monoisopropylxylene, diisopropyltoluene or tert-amylbenzene, a trichlorobenzene compound such as 1,2,4-trichlorobenzene, a nitrobenzene compound such as nitrobenzene or o-nitrotoluene, naphthalene, chloronaphthalene and isopropylnaphthalene. However, from the viewpoint of the environmental hygiene and the costs, a solvent comprising an alkylbenzene as the main component is usually employed. Further, the above solvents may be used in combination as a mixture of two or more. The solvent is used in an amount of from 1.5 to 7 times by weight, preferably from 1.7 to 3 times by weight, relative to the phthalic acid or its derivative.

In the present invention, the reaction temperature for the synthesis of copper phthalocyanine is usually from 140° to 230° C., preferably from 170° to 200° C. The reaction may be conducted under a pressure of from 0 to 20 kg/cm$^2$G. However, taking into consideration the loss of the solvent discharged out of the system accompanying the reaction gas, the decomposition of the starting material urea, the loss of the urea discharged out of the system in the form of ammonium cyanate and the operation efficiency of the reaction apparatus, the pressure is preferably from 2 to 5 kg/cm$^2$G.

The reaction may be conducted in a batch system or in a continuous system. After completion of the reaction, the solvent is usually distilled of from the reaction product under reduced pressure, and the residue thereby obtained is washed using hot water (60° to 80° C.) in an amount of from 3 to 10 times by weight relative to the residue.

With an aim to find out a way to improve the reaction yield and to reduce the free copper, the present inventors have analyzed and studied the reaction products in cases where cuprous chloride was used in the stoichiometric amount relative to the phthalic acid or its derivative (in the experiments, phthalimide was used) (Comparative Examples 1, 3 and 4). As a result, as shown in Table 1, parts of the starting material cuprous chloride and phthalimide were found to have converted to deactivated components (the chemical composition thereof was not identified, but they are compounds which are no longer capable of forming copper phthalocyanine even if they are present in the reaction system). Further, as compared with cuprous chloride, phthalimide has a larger amount of the deactivated component by from 1 to 3%. Thus, it has been found that when cuprous chloride is used in the stoichiometric amount or more relative to the phthalic acid or its derivative as was common in the conventional methods, the unreacted copper compound increases as free copper, which in turn lowers the purity. Accordingly, by reducing the amount of cuprous chloride relative to the phthalic acid or its derivative to a level corresponding the deactivated component of the phthalic acid or its derivative to be formed in excess of the deactivated component of cuprous chloride, it is possible to reduce free copper correspondingly and to improve the purity of the resulting phthalocyanine accordingly.

TABLE 1

| Test No. | Solvent for the reaction | Deactivated proportion of CuCl (% relative to fed CuCl) 1 | Deactivated proportion of phthalimide (% relative to fed phthalimide) 2 | Difference in the deactivated proportion (%) 2 − 1 |
|---|---|---|---|---|
| Comparative Example 1 | tert-Amylbenzene | 2 | 5 | 3 |
| Comparative Example 3 | Trichlorobenzene | 1.5 | 3.5 | 2 |
| Comparative Example 4 | Nitrobenzene | 1 | 2 | 1 |

To confirm this, the influence of the amount of cuprous chloride used was investigated using tert-amylbenzene as the solvent for reaction (the test method was in accordance with Example 1). The results are shown in Tables 2(1) and (2) and FIGS. 1 to 6. Referring to Table 2(1) and FIGS. 1 to 4, it is seen that up to 97% (relative to the stoichiometric amount), the effects of the amount of cuprous chloride used, are evident as an improvement of the purity and as a decrease of the free copper. Further, with respect to the yield, although the yield relative to phthalimide was found to decrease 1%, but the yield relative to cuprous chloride was found to increase 2%. Therefore, as a whole, no adverse effect was observed. This value of 97% corresponds to 3% of the difference in the deactivated proportion between cuprous chloride and phthalimide as shown by Comparative Example 1 (tert-amylbenzene solvent) in Table 1.

If the amount of cuprous chloride is less than 95%, no substantial effects for the improvement of the purity and the reduction of free copper tend to be observed, and on the other hand, an adverse effect tends to appear in the yield (the yield relative to phthalimide remarkably lowers, although the yield relative to cuprous chloride is constant). Thus, this is regarded as the lower limit for the amount of cuprous chloride.

The yield mentioned in the foregoing is a so-called crude yield. In addition to such a yield, a purity-calculated yield (an yield obtained by multiplying the purity to the above-mentioned yield) was calculated and shown in Table 2(1). The relation between the amount of cuprous chloride and this purity-calculated yield is shown in FIGS. 5 and 6. Referring to FIGS. 5 and 6, when the amount of cuprous chloride was reduced to 95%, the purity-calculated yield relative to cuprous chloride was improved, whereas the purity calculated yield relative to phthalimide was substantially constant, thus indicating the effects of reducing the amount of cuprous chloride. However, if the amount of cuprous chloride is less than the above-mentioned lower limit of 95%, it is evident that the purity-calculated yield relative to phthalimide remarkably decreases.

This is also true with respect to the washing solution, as is evident from Table 2(2) and FIGS. 7 and 8.

Namely, the concentration of copper ions contained in the washing solution remarkably decreases within a range of from 100% to 97% (relative to the stoichiometric amount) of the amount of cuprous chloride, as the amount of cuprous chloride decreases. However, even if the amount of cuprous chloride is further decreased, the copper ion concentration does not decrease any further.

On the other hand, BOD of the washing solution shows substantially a constant value within a range of from 100 to 95% (relative to stoichiometric amount) of the amount of cuprous chloride. However, if the amount of cuprous chloride is further reduced, BOD rapidly increases. This is understood to be attributable to adverse effects by the excessive reduction of the amount of cuprous chloride i.e. use of an excessive amount of phthalimide, since it is known that unreacted phthalimide and phthalamidic acid formed by the hydrolysis thereof and phthalic acid are the substances causing BOD.

TABLE 2(1)

| Amount of CuCl (% relative to the stoichiometric amount) | Method for washing the product | Copper phthalocyanine | | | | | |
|---|---|---|---|---|---|---|---|
| | | Yield (%) | | | Purity-calculated yield (%) | | |
| | | Relative to CuCl | Relative to phthalimide | Purity | Relative to CuCl | Relative to phthalimide | Free copper (%) |
| 103 | Washing with hot water | 96.5 | 99.4 | 95.8 | 92.4 | 95.2 | 0.97 |
| 100 | Washing with hot water | 98.5 | 98.5 | 96.7 | 95.2 | 95.2 | 0.76 |
| 98 | Washing with hot water | 100.0 | 98.0 | 97.5 | 97.5 | 95.5 | 0.49 |
| 97 | Washing with hot water | 100.8 | 97.8 | 97.8 | 98.6 | 95.6 | 0.42 |
| 96 | Washing with hot water | 101.3 | 97.2 | 98.1 | 99.4 | 95.4 | 0.34 |
| 95 | Washing with hot water | 101.7 | 96.6 | 98.2 | 99.9 | 94.9 | 0.31 |
| 92 | Washing with hot water | 101.5 | 93.4 | 98.1 | 99.6 | 91.6 | 0.23 |
| 90 | Washing with hot water | 101.6 | 91.4 | 98.2 | 99.8 | 89.8 | 0.21 |
| 100 | Washing with dilute sulfuric acid | 96.4 | 96.4 | 98.0 | 94.5 | 94.5 | 0.31 |

TABLE 2(2)

| Amount of CuCl (% relative to the stoichiometric amount) | Method for washing the product | Washing solution | | Notes |
|---|---|---|---|---|
| | | Copper ions (ppm) | BOD (ppm) | |
| 103 | Washing with hot water | — | — | |
| 100 | Washing with hot water | 35 | 740 | Comparative Example 1 |
| 98 | Washing with hot water | 13 | 730 | |
| 97 | Washing with hot water | 1.4 | 750 | Example 1 |
| 96 | Washing with hot water | 0.7 | 770 | Example 2 |
| 95 | Washing with hot water | 1.0 | 1300 | Example 3 |

TABLE 2(2)-continued

| Amount of CuCl (% relative to the stoichiometric amount) | Method for washing the product | Washing solution | | Notes |
| --- | --- | --- | --- | --- |
| | | Copper ions (ppm) | BOD (ppm) | |
| 92 | Washing with hot water | 1.2 | 3600 | |
| 90 | Washing with hot water | — | — | |
| 100 | Washing with dilute sulfuric acid | 350 | 1400 | Example 2 |

In the foregoing, the description has been made with respect to a case where tert-amylbenzene belonging to an alkylbenzene was used as the solvent for the reaction. However, as shown in Table 1, the preferred amount of cuprous chloride differs to some extent depending upon the solvent used. In general, the amount of cuprous chloride is preferably from 95 to 99% of the stoichiometric amount. Further, when an alkylbenzene compound, a trichlorobenzene compound or a nitrobenzene compound is used as the inert organic solvent, the preferred amount is from 95 to 98%, from 96 to 99% or from 97 to 99%, respectively.

Now, the present invention will be described in further detail with reference to Examples and Comparative Examples. In the present invention, the purity of copper phthalocyanine and the free copper content are values obtained by the following measuring methods, and the yield is the value calculated by the following calculation method.

(1) Measurement of the Purity of Copper Phthalocyanine 3.0 g of a sample was accurately weighed. Then, 30.0 g of sulfuric acid was added thereto, and the sample was dissolved. Then, 150 ml of cool water was added thereto, and the mixture was stirred at 90° C. for 30 minutes. Then, the precipitate was collected by filtration, and the cake was washed with hot water until the washing solution became neutral, then dried, cooled and weighed, whereupon the purity was obtained by the following equation:

$$\text{Purity (\%)} = \frac{\text{Precipitate (g)}}{\text{Sample (g)}} \times 100$$

(2) Measurement of the Free Copper Content

The filtrate and washing solution obtained in the measurement of the purity in the above step (1) were put together and adjusted to 1000 ml. A predetermined amount of this solution was sampled, and a predetermined amount of a carbon tetrachloride solution of DBDC (zinc dibenzyl dithio-carbamate $[(C_6H_5CH_2)_2NCSS]_2Zn$) was added thereto, and the absorbance was measured at 440 nm, and from the working curve preliminarily prepared, the copper content corresponding to the absorbance was obtained.

(3) Calculation Method for the Yield

The yield was calculated by the following equations:

① Calculation of the yield relative to the phthalic acid or its derivative $$\text{Yield (\%)} = \frac{S}{\frac{P}{M_{PA}} \times \frac{1}{4} \times M_{cp}} \times 100$$

② Calculation of the yield relative to cuprous chloride $$\text{Yield (\%)} = \frac{S}{\frac{C}{M_{CU}} \times M_{cp}} \times 100$$

In the above formulas, symbols have the following meanings:

S: Sampled amount (g) of the copper phthalocyanine compound

P: The amount (g) of phthalic acid or its derivative used

C: Amount (g) of cuprous chloride $M_{cp}$: Molecular weight of the copper phthalocyanine compound $M_{PA}$: Molecular weight of phthalic acid or its derivative $M_{CU}$: Molecular weight of cuprous chloride (99.0)

EXAMPLE 1

180 Parts of phthalimide, 29.4 parts (97% of the stoichiometric amount) of cuprous chloride, 169 parts of urea, 0.2 part of ammonium molybdate, 308 parts of tert-amylbenzene were charged into a 1 l glass autoclave. While discharging ammonia and carbon dioxide produced as by-products and maintaining the reaction pressure at a level of 2.5 kg/cm²G, the reaction temperature was gradually raised from 170° C. to a final temperature of 200° C., and the reaction was completed in 3.5 hours. From the reaction product thus obtained, the solvent tert-amylbenzene was distilled off by a reduced pressure distillation method (170° C., 100-5 mmHg, for 3 hours). Then, 1200 parts of water was added to this residue and subjected to washing with hot water under stirring at 70° C. for 2 hours. After filtration, the cake was washed with 700 parts of water at 70° C. This cake was dried at 120° C. over a period of 20 hours to obtain 172.3 parts of copper phthalocyanine having a purity of 97.6% and a free copper content of 0.42%. The yield was 97.8% relative to phthalimide and 100.8% relative to cuprous chloride. Further, the copper ions in the washing solution (inclusive of the washing solution of the cake, the same applies to the following Examples and Comparative Examples) were 1.4 ppm, and BOD was 750 ppm.

EXAMPLE 2

The operation was conducted in the same manner as in Example 1 except that 29.1 parts (96% of the stoichiometric amount) of cuprous chloride was used, to obtain 171.3 parts of copper phthalocyanine having a purity of 98.1% and a free copper content of 0.34%. The yield was 97.2% relative to phthalimide and 101.3% relative to cuprous chloride. The copper ions in the washing solution were 0.7 ppm, and BOD was 770 ppm.

EXAMPLE 3

The operation was conducted in the same manner as in Example 1 except that 28.8 parts (95% of the stoichiometric amount) of cuprous chloride was used, to obtain 170.2 parts of copper phthalocyanine having a purity of 98.0% and a free copper content of 0.31%. The yield was 96.6% relative to phthalimide and 101.7% relative to cuprous chloride. Further, the copper ions in the washing solution were 1.0 ppm, and BOD was 1300 ppm.

COMPARATIVE EXAMPLE 1

The operation was conducted in the same manner as in Example 1 except that 30.3 parts (100% of the stoichiometric amount) of cuprous chloride was used, to obtain 173.1 parts of copper phthalocyanine having a purity of 96.7% and a free copper content of 0.76%. The yield was 98.5%. Further, the copper ions in the washing solution were 35 ppm, and BOD was 740 ppm.

COMPARATIVE EXAMPLE 2

The operation was conducted in the same manner as in Example 1 up to the operation of the distillation of the solvent except that 30.3 parts (100% of the stoichiometric amount) of cuprous chloride was used. To the residue after removal of the solvent, 1200 parts of water and 12 parts of sulfuric acid were added, and the mixture was stirred at 70° C. for 2 hours and then subjected to filtration. The cake obtained by the filtration was thoroughly washed with 1500 parts of water of about 70° C. (until the washing solution became neutral). This cake was dried to obtain 169.8 parts of copper phthalocyanine having a purity of 98.0% and a free copper content of 0.31%. Further, the copper ions in the washing solution were 350 ppm, and BOD was 1400 ppm.

EXAMPLE 4

The operation was conducted in the same manner as in Example 1 except that 500 parts of trichlorobenzene was used as the solvent for the reaction, to obtain 173.1 parts of copper phthalocyanine having a purity of 99.1% and a free copper content of 0.23%. The yield was 98.3% relative to phthalimide and 101.4% relative to cuprous chloride. The copper ions in the washing solution were 0.8 ppm.

COMPARATIVE EXAMPLE 3

The operation was conducted in the same manner as in Example 4 except that 30.3 parts (100% of the stoichiometric amount) of cuprous chloride was used, to obtain 174.9 parts of copper phthalocyanine having a purity of 97.5% and a free copper content of 0.54%. The yield was 99.3%. The copper ions in the washing solution were 27 ppm.

EXAMPLE 5

The operation was conducted in the same manner as in Example 1 except that 30.0 parts (99% of the stoichiometric amount) of cuprous chloride, 184 parts of urea and 430 parts of nitrobenzene as the solvent for the reaction were used, to obtain 174.7 parts of copper phthalocyanine having a purity of 99.6% and a free copper content of 0.19%. The yield was 99.2% relative to phthalimide and 100.2% relative to cuprous chloride. The copper ions in the washing solution were 1.7 ppm.

COMPARATIVE EXAMPLE 4

The operation was conducted in the same manner as in Example 5 except that 30.3 parts (100% of the stoichiometric amount) of cuprous chloride was used, to obtain 175.2 parts of copper phthalocyanine having a purity of 99.0% and a free copper content of 0.27%. The yield was 99.5%. The copper ions in the washing solution were 109 ppm.

EXAMPLE 6

The operation was conducted in the same manner as in Example 1 except that 30.0 parts (99% of the stoichiometric amount) of cuprous chloride, 184 parts of urea and 450 parts of o-nitrotoluene as the solvent for the reaction were used, to obtain 176.6 parts of copper phthalocyanine having a purity of 99.1% and a free copper content of 0.21%. The yield was 100.3% relative to phthalimide and 101.3% relative to cuprous chloride.

COMPARATIVE EXAMPLE 5

The operation was conducted in the same manner as in Example 6 except that 30.3 parts (100% of the stoichiometric amount) of cuprous chloride was used, to obtain 177.0 parts of copper phthalocyanine having a purity of 98.2% and a free copper content of 0.30%. The yield was 100.5%.

EXAMPLE 7

The reaction, the removal of the solvent, the washing with hot water and drying were conducted in the same manner as in Example 1 using 19.2 parts (95% of the stoichiometric amount) of cuprous chloride, 90.0 parts of phthalimide, 37.1 parts of 4-chlorophthalimide, 123 parts of urea, 25 part of ammonium chloride, 0.2 part of ammonium molybdate and 380 parts of tert-amylbenzene, to obtain 119.2 parts of monochlorocopper phthalocyanine having a purity of 98.5% and a free copper content of 0.28%. The yield was 95.5% relative to phthalimide and 100.5% relative to cuprous chloride. Further, the copper ions in the washing solution were 1.3 ppm.

COMPARATIVE EXAMPLE 6

The operation was conducted in the same manner as in Example 7 except that 20.2 parts (100% of the stoichiometric amount) of cuprous chloride was used, to obtain 122.7 parts of monochlorocopper phthalocyanine having a purity of 95.9% and a free copper content of 0.88%. The yield was 98.4%. Further, the copper ions in the washing solution was 47 ppm.

COMPARATIVE EXAMPLE 7

The operation was conducted in the same manner as in Example 7 up to the operation of the removal of the solvent except that 20.2 parts (100% of the stoichiometric amount) of cuprous chloride was used. To the residue thus obtained, 1200 parts of water and 12 parts of sulfuric acid were added, and the mixture was stirred at 70° C. for 2 hours and then subjected to filtration. Then, the cake was thoroughly washed with 1500 parts of water of about 70° C. (until the washing solution became neutral). The cake was dried to obtain 119.5 parts of monochlorocopper phthalocyanine having a purity of 99.5% and a free copper content of 0.18%. The yield was 95.8%. Further, the copper ions in the washing solution was 320 ppm.

As described in the foregoing, by adjusting the amount of cuprous chloride used to a level of from 95 to 99% of the stoichiometric amount, a copper phthalocyanine compound having a high purity and a low free copper content can be obtained simply by washing with hot water without reducing the yield. The copper ions in the washing solution can thereby be substantially reduced, and therefore the operation for the removal of copper ions in the waste water can be eliminated or simplified.

What is claimed is:

1. A process for producing a copper phthalocyanine compound, which comprises heating and reacting a first compound selected from the group consisting of phthalic acid, phthalic anhydride, phthalimide and one of these compounds having the 3- or 4-position of the benzene nuclei substituted by chlorine or bromine; a second compound selected from the group consisting of urea, buret and tolyuret; and cuprous chloride in the presence of a catalyst in an inert organic solvent; distilling off the solvent from the reaction product after the reaction; and washing the residue thereby obtained with hot water; and filtering said washed residue, wherein the cuprous chloride is used in an amount of from 95 to 99% of the stoichiometric amount relative to the first compound, so that the content of copper ions in the filtrate is reduced.

2. The process for producing a copper phthalocyanine compound according to claim 1, wherein said residue is washed with water at a temperature of from 60° to 80° C. in an amount of from 3 to 10 times by weight relative to the residue.

3. The process according to claim 1, wherein the purity of the copper phthalocyanine compound obtained by the washing with hot water is at least 97%, and free copper is at most 0.5%.

4. The process for producing a copper phthalocyanine compound according to claim 1, wherein an alkylbenzene compound is used as the inert organic solvent, and the cuprous chloride is used in an amount of from 95 to 98% of the stoichiometric amount relative to the phthalic acid or the phthalic acid derivative.

5. The process for producing a copper phthalocyanine compound according to claim 1, wherein a trichlorobenzene compound is used as the inert organic solvent, and the cuprous chloride is used in an amount of from 96 to 99% of the stoichiometric amount relative to the phthalic acid or the phthalic acid derivative.

6. The process for producing a copper phthalocyanine compound according to claim 1, wherein a nitrobenzene compound is used as the inert organic solvent, and the cuprous chloride is used in an amount of from 97 to 99% of the stoichiometric amount relative to the phthalic acid or the phthalic acid derivative.

7. The process for producing a copper phthalocyanine compound according to claim 1, wherein said reaction is effected at from 140° to 230° C.

8. The process for producing a copper phthalocyanine compound according to claim 1, wherein said reaction is effected at pressure of from 0 to 20 kg/cm$^2$G.

9. The process for producing a copper phthalocyanine compound according to claim 8, wherein said reaction is effected at pressure of from 2 to 5 kg/cm$^2$G.

10. The process for producing a copper phthalocyanine compound according to claim 1, wherein said catalyst is selected from the group consisting of molybdenum, ammonium molybdate and molybdenum oxide; and is used in an amount of from 0.003 to 5% by weight relative to the first compound.

11. The process for producing a copper phthalocyanine compound according to claim 4, wherein said alkylbenzene is selected from the group consisting of diisopropylbenzene, monoisopropylxylene, diisopropyltoluene and tert-amylbenzene; and is used in an amount of from 1.5 to 7 times by weight relative to the first compound.

12. The process for producing a copper phthalocyanine compound according to claim 7, wherein said reaction is effected at from 170° to 200° C.

* * * * *